(12) United States Patent
Rakshit et al.

(10) Patent No.: US 10,735,579 B2
(45) Date of Patent: Aug. 4, 2020

(54) CONTEXTUAL ANALYSIS OF INCOMING PHONE CALLS TO DETERMINE PROBABILITY OF CONNECTION

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); Hernan A. Cunico, Holly Springs, NC (US); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 68 days.

(21) Appl. No.: 16/195,173

(22) Filed: Nov. 19, 2018

(65) Prior Publication Data
US 2020/0162602 A1 May 21, 2020

(51) Int. Cl.
*H04M 3/02* (2006.01)
*H04M 3/42* (2006.01)
*H04M 7/00* (2006.01)
*H04M 1/725* (2006.01)

(52) U.S. Cl.
CPC ......... *H04M 3/02* (2013.01); *H04M 3/42059* (2013.01); *H04M 3/42093* (2013.01); *H04M 7/0033* (2013.01); *H04M 1/72519* (2013.01)

(58) Field of Classification Search
CPC . H04M 3/02; H04M 3/42059; H04M 1/72519

USPC ................ 379/252, 201.01, 179, 76, 208.01; 455/567

See application file for complete search history.

(56) References Cited

U.S. PATENT DOCUMENTS

| | | | |
|---|---|---|---|
| 5,784,438 A * | 7/1998 | Martinez ................ | H04M 3/48 379/207.08 |
| 5,896,448 A | 4/1999 | Holt | |
| 7,764,782 B1 * | 7/2010 | Coughlan ............... | H04M 3/02 367/93 |

(Continued)

OTHER PUBLICATIONS

Schut et al., "Biometrics for Emotion Detection (BED1): Exploring the combination of Speech and ECG", 2010, 8 pages.

(Continued)

*Primary Examiner* — William J Deane, Jr.
(74) *Attorney, Agent, or Firm* — James Nock; Andrew D. Wright; Roberts Calderon Safran & Cole, P.C.

(57) ABSTRACT

A computer-implemented method includes: determining, by a computer device, contextual data of plural calls to a callee; generating, by the computer device, a predictive model based on the contextual data of the plural calls; determining, by the computer device, contextual data of a current call to the callee; determining, by the computer device and based on the model and the contextual data of the current call, a probability that the callee will answer the current call; determining, by the computer device and based on the model and the contextual data of the current call, an amount of time to ring for the current call; instructing, by the computer device, a caller device to display the determined probability; and instructing, by the computer device, a callee device to control an amount of rings for the current call based on the determined amount of time to ring.

20 Claims, 6 Drawing Sheets

(56) References Cited

U.S. PATENT DOCUMENTS

| | | |
|---|---|---|
| 9,143,611 B2 | 9/2015 | Hartley et al. |
| 9,167,084 B2 | 10/2015 | Chung et al. |
| 9,781,256 B2 | 10/2017 | Milstein |
| 9,942,389 B2 | 4/2018 | Cunico et al. |
| 2005/0195802 A1 | 9/2005 | Klein et al. |
| 2007/0037605 A1* | 2/2007 | Logan ............... H04M 3/42229 455/567 |
| 2007/0224997 A1 | 9/2007 | Florkey et al. |
| 2009/0168977 A1 | 7/2009 | Galvin |
| 2015/0227285 A1* | 8/2015 | Lee .................... G06F 3/04817 715/765 |
| 2015/0296081 A1* | 10/2015 | Jeong ............... H04M 3/42042 379/142.01 |
| 2016/0006867 A1 | 1/2016 | Czarnecki et al. |
| 2016/0260119 A1* | 9/2016 | Kim ................... G06Q 30/0231 |
| 2018/0054412 A1 | 2/2018 | Cunico et al. |
| 2019/0045056 A1 | 2/2019 | Duan et al. |
| 2019/0312974 A1* | 10/2019 | Soundar ................. H04M 3/51 |

OTHER PUBLICATIONS

Anonymously, "System and method to dynamically update the caller on the availability of the callee before connecting the call", IPCOM000240942D, Mar. 12, 2015, 5 pages.

Anonymously, "[A-H]—System for communicating sentiment in remote collaboration environments", IPCOM000251068D, Oct. 6, 2017, 5 pages.

\* cited by examiner

CONTEXTUAL ANALYSIS OF INCOMING PHONE CALLS TO DETERMINE PROBABILITY OF CONNECTION

BACKGROUND

The present invention relates generally to telephone calls made using computer devices and, more particularly, to systems and methods that provide contextual analysis of incoming phone calls on mobile devices to derive a probability of connection.

Telephone calls have long been, and continue to be, ubiquitous among individuals wishing to communicate with each other. Such calls are increasingly being made with computer devices, such as mobile devices, smartphones, etc.

SUMMARY

In a first aspect of the invention, there is a computer-implemented method including: determining, by a computer device, contextual data of plural calls to a callee; generating, by the computer device, a predictive model based on the contextual data of the plural calls; determining, by the computer device, contextual data of a current call to the callee; determining, by the computer device and based on the model and the contextual data of the current call, a probability that the callee will answer the current call; determining, by the computer device and based on the model and the contextual data of the current call, an amount of time to ring for the current call; instructing, by the computer device, a caller device to display the determined probability; and instructing, by the computer device, a callee device to control an amount of rings for the current call based on the determined amount of time to ring.

In another aspect of the invention, there is a computer program product including a computer readable storage medium having program instructions embodied therewith. The program instructions are executable by a computer device to cause the computer device to determine contextual data of plural calls to a callee; generate a predictive model based on the contextual data of the plural calls; determine contextual data of a current call to the callee; determine, based on the model and the contextual data of the current call, a probability that the callee will answer the current call; and instruct a caller device to display the determined probability.

In another aspect of the invention, there is system including a processor, a computer readable memory, and a computer readable storage medium. The system includes: program instructions to determine contextual data of plural calls to a callee; program instructions to generate a predictive model based on the contextual data of the plural calls; program instructions to determine contextual data of a current call to the callee; program instructions to determine, based on the model and the contextual data of the current call, an amount of time to ring for the current call; program instructions to instruct a callee device to control an amount of rings for the current call based on the determined amount of time to ring. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
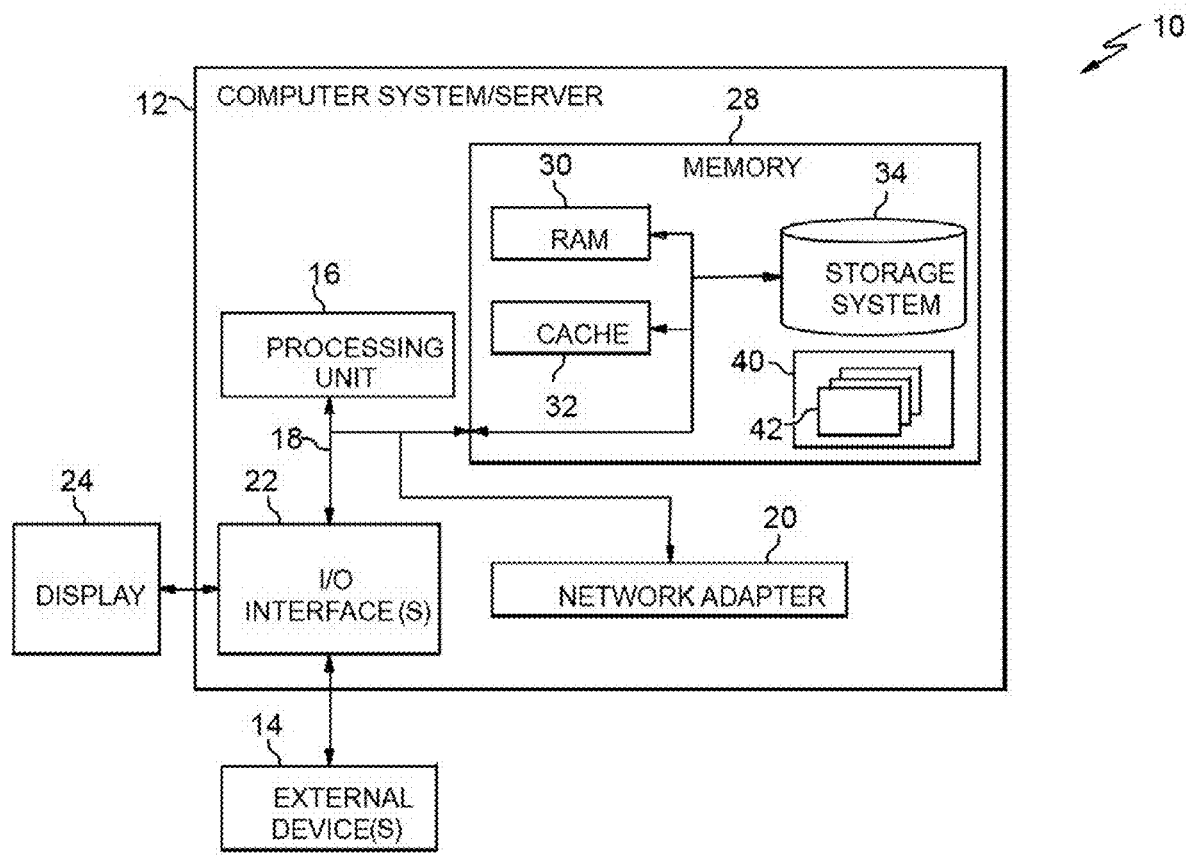
FIG. 1 depicts a computer infrastructure according to an embodiment of the present invention.

The present invention relates generally to telephone calls made using computer devices and, more particularly, to systems and methods that provide contextual analysis of incoming phone calls on mobile devices to derive a probability of connection. According to aspects of the invention, a system records contextual factors when a receiving party accepts an incoming phone call on their mobile device. In embodiments, the contextual factors include the identity and relationship of the caller, and the location, device, derived activity, and derived emotional state of the receiving party (also referred to as the callee). In embodiments, the system determines and presents the caller with a forecast probability that their call will be accepted (e.g., answered) by the receiving party, based on historical and current analysis of contextual factors related to the receiving party. In additional embodiments, the system determines a duration the receiving party's mobile device should ring before being sent to voicemail.

When a calling party (also referred to as a caller) places a call on their mobile device to another mobile device, the calling party does not know what the receiving party is doing and therefore does not know the likelihood that the receiving party will connect (e.g., answer) the call. Additionally, when a receiving party receives an incoming call, the duration that the mobile device will ring before being sent to voicemail to set to a predefined time (e.g., a predefined number of rings). However the optimal time their mobile device should ring is dependent upon contextual factors.

Implementations of the invention address these shortcomings by providing a system and method that forecast the probability that a receiving party will accept an incoming phone call and presents this forecast to the calling party placing the call. In embodiments, the forecast probability is based on contextual factors of what the receiving party is doing and how they have responded in similar situations in the past. For example a receiving party may typically answer a call from a family member when in a business meeting, but not from an acquaintance. In additional embodiments, the system and method forecast how long the receiving party's mobile device should ring before sending the call to voicemail. For example if the receiving party is in a meeting and is forecast to want to accept the call, the phone should ring longer to give them time to leave the meeting room before accepting the call.

Embodiments of the invention improve the technology of telephone calls by providing users with automated tools that determine and display a probability that a current call will be connected (e.g., answered) by the callee. Embodiments of the invention further improve the technology of telephone calls by automatically adjusting a number of rings on a callee's device based on contextual factors associated with the current call. Embodiments of the invention employ an unconventional arrangement of steps including: determining contextual data of calls to a callee; generating a predictive model based on the contextual data; determining contextual data of a current call to the callee; determining, using the model and the contextual data of a current call, a probability the callee will answer the current call; determining, using the model and the contextual data of a current call, an amount of time to ring the current call; transmitting instructions to the caller device causing the caller device to display the determined probability; and transmitting instructions to the callee device causing the callee device to control the number of rings based on the determined time. The steps themselves are unconventional, and the combination of the steps is also unconventional. For example, the step generating a predictive model based on the contextual data creates new information that does not exist in the system, and this new information is then used in subsequent steps in an unconventional manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
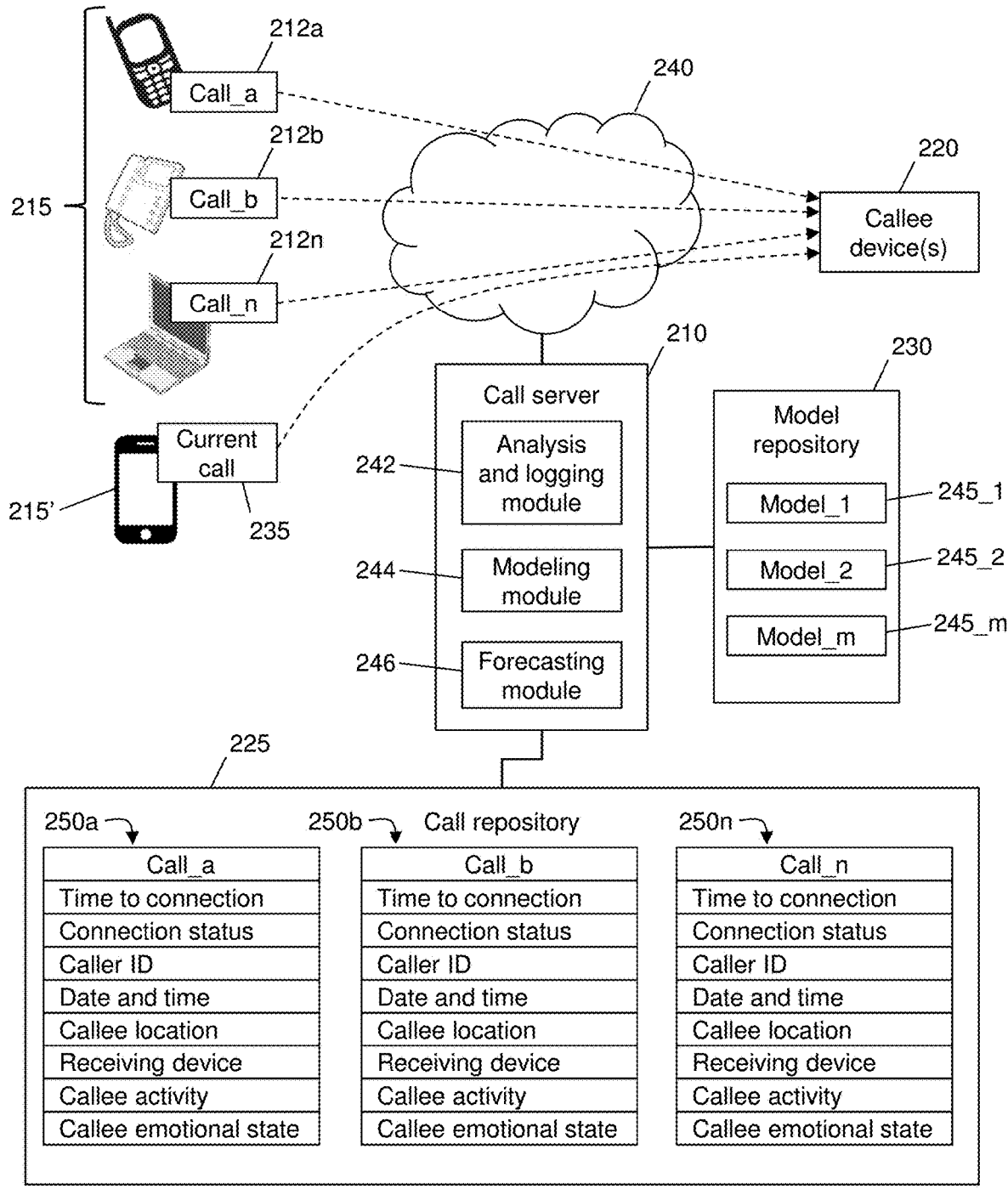
FIG. 2 shows a block diagram of an exemplary environment in accordance with aspects of the invention.

FIG. 2 shows a functional block diagram of an exemplary environment in accordance with aspects of the invention. In embodiments, the environment includes a call server 210 that monitors calls 212a-n made from caller devices 215 to the callee device 220. According to aspects of the invention, the call server 210 determines and stores contextual data about the calls 212a-n in a call repository 225, generates a model for the callee based on the contextual data about the calls 212a-n, and stores the model in a model repository 230. In implementations, when a current call 235 is made from a caller device 215' to the callee device 220, the call server 210 determines contextual data about the current call 235, and applies the model for this callee to the contextual data about the current call 235 to determine a forecast probability that the callee will answer the current call 235 and a forecast time to ring for the current call 235. In embodiments, the call server 210 transmits the forecast probability to the caller device 215' for displaying to the caller of the current call 235. In embodiments, the call server 210 transmits instructions to the callee device 220 to adjust a number of rings for the current call 235 (e.g., change from a pre-defined number of rings) based on the forecast time to ring for the current call 235.

As depicted in FIG. 2, the callee device 220 receives any number "n" calls 212*a-n* from caller devices 215 via a network 240. The network 240 may comprise any suitable communication network, such as a LAN, WAN, or the Internet, or a combination of such communication networks.

The caller devices 215 and 215' can be any type of computer device capable of making a telephone call, via the network 240, using a telephone number associated with the callee. For example, the caller devices 215 and 215' may comprise smartphones, office phones, laptop computers, tablet computers, desktop computers, smart watches, etc. Similarly, the callee device 220 may comprise any type of computer device capable of receiving an incoming telephone call via the network 240. For example, the callee device 220 may comprise a smartphone, office phone, laptop computer, tablet computer, desktop computer, smart watch, etc. In embodiments, the callee device 220 may comprise more than one device that is associated with the telephone number associated with the callee. For example, a single user (i.e., the callee) may have plural devices on which the callee can receive a call to a single number. For example, an incoming call to the telephone number associated with the callee may ring at each of a laptop computer, smartphone, and smart watch owned by the callee, and the callee may choose one of these devices with which to accept the incoming call.

The call server 210 comprises a computer server that includes one or more elements of the computer system 12 of FIG. 1. According to aspects of the invention, the call server 210 comprises program modules that are configured to perform functions described herein. For example, in an embodiment, the call server 210 comprises an analysis and logging module 242, a modeling module 244, and a forecasting module 246, each of which comprises one or more program modules such as program modules 42 described with respect to FIG. 1. The call server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

According to aspects of the invention, the analysis and logging module 242 is configured to determine and store contextual data about the incoming calls 212*a-n* to the callee in the call repository 225. For example, the analysis and logging module 242 stores contextual data about incoming call 212*a* in a data structure 250*a* in the call repository 225. Similarly, the analysis and logging module 242 stores contextual data about the other incoming calls 212*b-n* in respective data structures 205*b-n* in the call repository 225.

In embodiments, the contextual data stored in the data structures 250*a-n* for each of the calls 212*a-n* includes: time to connection; connection status; caller ID; date and time; callee location; receiving device; callee activity; and callee emotional state. Although specific examples of types of contextual data are described herein for illustrating aspects of the invention, it should be understood that embodiments of the invention are not limited to these types of contextual data and that other types and combinations of types of contextual data may be used in embodiments.

For illustrative purposes, each of the different types of contextual data is described herein with respect to call 212*a*. However, it should be understood that the call server 210 determines contextual data for each of the calls 212*a-n*.

According to aspects of the invention, "time to connection" refers to an amount of time that elapsed before the callee answered an incoming call (e.g., call 212*a*). In embodiments, the time to connection is a numeric value that is based on how long the callee device 220 was ringing for the call before the callee answers the call. In the event that the callee does not answer the call, the analysis and logging module 242 records the length of time that the callee device rang before the caller ended the call or before the call went to voicemail of the callee. In embodiments, the analysis and logging module 242 obtains the time to connection information from the callee device 220, e.g., during the call or after the conclusion of the call, and assigns a numeric value to a field of the data structure (e.g., data structure 250*a*) based on this information.

According to aspects of the invention, "connection status" refers to how the incoming call (e.g., call 212*a*) was connected. In embodiments, the connection status is a numeric value that represents whether the call was answered by the callee, sent to voicemail of the callee, or disconnected by the caller before being answered and before going to voicemail. In embodiments, the analysis and logging module 242 obtains information from the callee device 220 that defines how the incoming call was connected, and assigns a numeric value to a field of the data structure (e.g., data structure 250*a*) based on this information.

According to aspects of the invention, "caller ID" refers to a numerical measure of closeness of a relationship between the caller of the incoming call (e.g., call 212*a*) and the callee. In embodiments, the caller ID is based on factors including at least one of: number of past (historic calls) between the caller and the callee; same surname for each of the caller and the callee; closeness of geographic locations of the caller and the callee; and social media information that defines one or more relationships between the caller and the callee (e.g., friend, spouse, co-worker, etc.). In embodiments, the analysis and logging module 242 uses algorithms to determine a numeric value of caller ID based on the factors, and assigns the numeric value to a field of the data structure (e.g., data structure 250*a*) based on this determining. The algorithms used to determine the numeric value of the caller ID may be based on numerical techniques such as jaccard distance, for example.

In embodiments, the analysis and logging module 242 obtains information about the number of past (historic calls) between the caller and the callee from a data repository that logs such data and/or from the call history of the callee device 220. In aspects, the algorithms used to determine the numeric value of the caller ID may be configured such that a higher number of historic calls increases the caller ID numeric value, whereas a lower number of historic calls decreases the caller ID numeric value.

In embodiments, the analysis and logging module 242 obtains information about the surname of each of the caller and the callee from public records associated with phone numbers and/or from identifying information stored on each of the caller device 215 and the callee device 220. In aspects, the algorithms used to determine the numeric value of the caller ID may be configured such that a same surname increases the caller ID numeric value, whereas a different surname decreases the caller ID numeric value.

In embodiments, the analysis and logging module 242 obtains information about the geographic locations of the caller and the callee from location systems (e.g., global positioning systems) of each of the caller device 215 and the callee device 220. In aspects, the algorithms used to determine the numeric value of the caller ID may be configured such that a closer geographic distance between the caller and the callee increases the caller ID numeric value, whereas a farther geographic distance between the caller and the callee decreases the caller ID numeric value.

In embodiments, the analysis and logging module 242 obtains social media content from social media accounts of the callee that the callee has registered with the system. For example, the callee may provide input via the callee device 220 that specifies a social media account of the callee and that gives the call server 210 permission to analyze content of the specified social media account. Based on this analysis, the analysis and logging module 242 may determine that the caller is tagged with a status (e.g., friend, spouse, co-worker, etc.) relative to the callee. In aspects, data stored by the analysis and logging module 242 defines different numeric values for different tags, such that the analysis and logging module 242 adjusts the caller ID numeric value based on any such determined tags for the caller of the incoming call.

According to aspects of the invention, "date and time" refers to the date and time of the incoming call (e.g., call 212a). In embodiments, the analysis and logging module 242 obtains the date and time from the callee device 220, e.g., during the call or after the conclusion of the call, and stores data representing the date and time in one or more fields of the data structure (e.g., data structure 250a).

According to aspects of the invention, "callee location" refers to a geographic location of the callee at the time of the incoming call (e.g., call 212a). In embodiments, the analysis and logging module 242 obtains the geographic location from the callee device 220, e.g., from a location system such as a global positioning system (GPS) of the callee device 220, and stores data representing the geographic location in one or more fields of the data structure (e.g., data structure 250a). The geographic location may additionally or alternatively be determined using other techniques such as cellular triangulation and/or wireless network location tracking.

According to aspects of the invention, "receiving device" refers to which one of plural callee devices the callee used to answer the incoming call (e.g., call 212a). As described herein, the callee device 220 may comprise more than one device that is associated with the telephone number associated with the callee. For example, the callee may have plural devices on which the callee can receive a call to a single number. In embodiments, the receiving device data is a numeric value that represents which one of plural callee devices the callee used to answer the incoming call. In embodiments, the analysis and logging module 242 obtains information from the callee device 220 that defines which device received the incoming call, and assigns a numeric value to a field of the data structure (e.g., data structure 250a) based on this information. In the event the callee device 220 consists of a single device (i.e., one device that the callee uses to answer all incoming calls), then the analysis and logging module 242 assigns the same data to this data field for every incoming call for this callee.

According to aspects of the invention, "callee activity" refers to an activity the callee is engaged in at the time of the incoming call (e.g., call 212a). In embodiments, the analysis and logging module 242 determines an activity the callee is engaged in at the time of the incoming call based on analyzing data from sources such as electronic calendars and biometric devices. In one example, the analysis and logging module 242 analyzes one or more electronic calendars of the callee to determine an activity in which the callee is engaged at the time of the incoming call, such as work meeting, video conference, vacation, medical appointment, etc. In another example, the analysis and logging module 242 analyzes data from one or more biometric devices of the callee to determine an activity in which the callee is engaged at the time of the time of the incoming call, such as exercising, sleeping, etc. In embodiments, the analysis and logging module 242 determines the callee activity using at least one of these sources, or other sources, and stores data representing the callee activity in one or more fields of the data structure (e.g., data structure 250a).

According to aspects of the invention, "callee emotional state" refers to a determined emotional state of callee at the time of the incoming call (e.g., call 212a). In embodiments, the analysis and logging module 242 determines an emotional state of the callee based on analyzing data from sources such as recent communications and biometric devices. In embodiments and based on this analysis, the analysis and logging module 242 uses one or more algorithms to determine a numeric value that represents the callee emotional state, and assigns the numeric value to a field of the data structure (e.g., data structure 250a).

In embodiments, the analysis and logging module 242 determines the callee emotional state by analyzing recent communications of the callee, such as text messages, emails, and social media posts that occurred within a threshold amount of time relative to the date and time of the incoming call (e.g., call 212a). For example, the callee may provide input via the callee device 220 that grants permission to the call server 210 to analyze the callee's text messages, emails, and social media posts. Based on this permission, the analysis and logging module 242 may analyze one or more of the callee's text messages, emails, and social media posts using tone analysis to determine respective numeric measures of predetermined emotional components (e.g., anger, disgust, fear, joy, and sadness) for the callee. The analysis and logging module 242 may include algorithms to perform the tone analysis, or alternatively may communicate with another computer device to perform the analysis (e.g., via an application program interface (API) call to a separate cognitive computing system). The threshold amount of time that defines what qualifies as a recent communication may be a user-defined setting, such as a configurable setting of the user device 220. In one example, the threshold amount of time is thirty minutes, although other values may be used.

In embodiments, the analysis and logging module 242 determines the callee emotional state by analyzing recent biometric data of the callee that was recorded within a threshold amount of time relative to the date and time of the incoming call (e.g., call 212a). The analysis and logging module 242 may obtain the biometric data from sources such as: a biometric device (e.g., fitness band) worn by the callee; audio data from recent calls; audio and/or video data from recent video conferences. For example, the callee may provide input via the callee device 220 that grants permission to the call server 210 to analyze data from at least one of a biometric device worn by the callee, audio data of the callee's calls, and audio and/or video data from recent video conferences in which the callee participated. Based on this permission, the analysis and logging module 242 may analyze data from at least one of these sources using to determine respective numeric measures of predetermined emotional components (e.g., anger, disgust, fear, joy, and sadness) for the callee. The analysis may include, for example, one or more of: tone analysis of audio data of calls; tone analysis of audio data of video conferences; body language analysis of video data of video conferences; and emotive analysis of combinations of heart rate variability (e.g., pulse) and movement analysis (e.g., accelerometer) data from a biometric device. The analysis and logging module 242 may include algorithms to perform the biometric data analysis, or alternatively may communicate with another computer device to perform the analysis (e.g., via an application program interface (API) call to a separate cognitive computing system). The threshold amount of time that defines what qualifies as recent biometric data may be a user-defined setting, such as a configurable setting of the user device 220. In one example, the threshold amount of time is thirty minutes, although other values may be used. In embodiments, the threshold amount of time that defines what qualifies as recent biometric data is separately configurable independent of the threshold amount of time that defines what qualifies as a recent communication.

Still referring to FIG. 2, each incoming call to the callee is handled in this manner to build up a repository of incoming calls 212a-n and the context data associated with the incoming calls 212a-n. Although only a single callee device 220 is shown in FIG. 2, the system performs similar contextual analysis and storage for other incoming calls for different callees. In this manner, each different callee has a corpus of data stored in the call repository 225 that represents context associated with their incoming calls. In embodiments, the call repository 225 is stored in a cloud computing environment so as to be accessible to both calling and receiving parties.

According to aspects of the invention, the modeling module 244 is configured to generate a model for each callee based on the contextual data stored in the call repository 225. Continuing the example of FIG. 2, the modeling module 244 generates a model 245_1 for the callee associated with the callee device 220, wherein the model 245_1 is derived from the data structures 250a-n that are associated with the calls 212a-n to this particular callee. A different model 245_2 is generated for a second callee (e.g., based on the context data of the calls directed to the second callee), and a different model 245_m is generated for an $m^{th}$ callee (e.g., based on the context data of the calls directed to the $m^{th}$ callee). In this manner, the modeling module 244 determines a respective model for each different callee and stores the models in the model repository 230.

In embodiments, each model (e.g., model 245_1) is a function of the contextual data stored in the data structures 250a-n, as represented by Formula 1:

$$f(\text{Time to connection, Connection status, Caller ID,} \\ \text{Date and time, Callee location, Receiving} \\ \text{device, Callee activity, Callee emotional state}) \quad (1)$$

In embodiments, each model (e.g., model 245_1) is a logistic regression model that the modeling module 244 derives based on multivariate logistic regression analysis of the contextual data in the data structures (e.g., data structures 250a-n). In embodiments, the logistic regression model receives values for each of (Time to connection, Connection status, Caller ID, Date and time, Callee location, Receiving device, Callee activity, Callee emotional state) as inputs, and based on these inputs the logistic regression model outputs: a forecast probability the callee will answer the call; and a forecast amount of time to ring for the current call.

Still referring to FIG. 2, after the model 245_1 is created, the forecasting module 246 uses the model 245_1 to generate forecasts about a current incoming call 235 to the callee device 220. In embodiments, the analysis and logging module 242 determines context data for the current call 235 in the same manner as described with respect to previous calls 212a-n. That is to say, continuing the example of FIG. 2, the analysis and logging module 242 determines values for each of Time to connection, Connection status, Caller ID, Date and time, Callee location, Receiving device, Callee activity, and Callee emotional state for the current call 235. The analysis and logging module 242 then passes these determined values for the current call to the forecasting module 246, which applies the determined values as inputs to the model 245_1 in order to determine a forecast probability the callee will answer the current call 235 and a forecast amount of time to ring for the current call 235.

Figure 3:
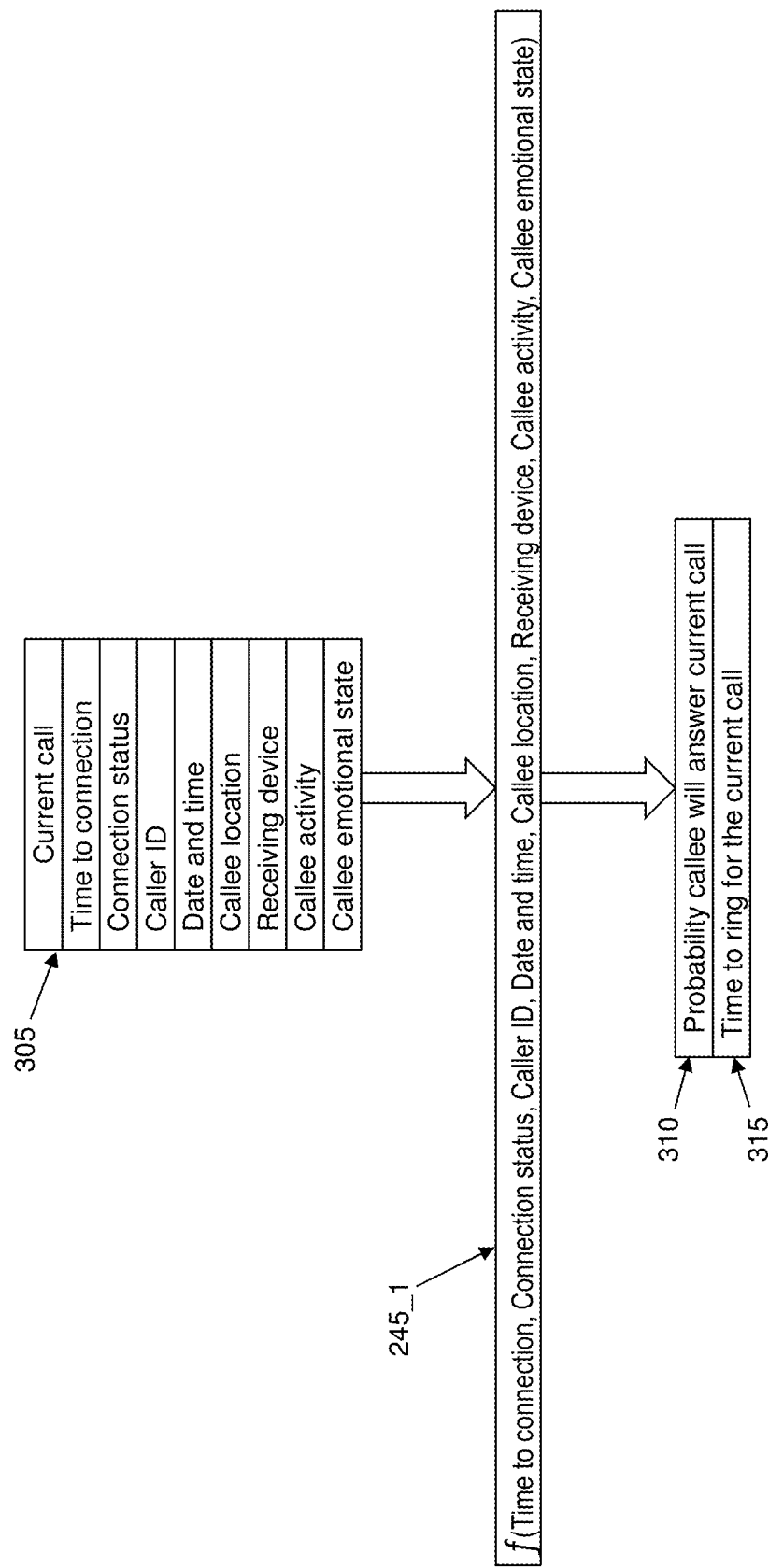
FIG. 3 shows inputs and outputs of a forecasting model in accordance with aspects of the invention.

FIG. 3 illustrates how the system handles a current call using the model for the callee of the current call. FIG. 3 is described with reference to elements of FIG. 2. As shown in FIG. 3, in response to the caller device 215' making the current call 235 to the callee device 220, the analysis and logging module 242 determines context data 305 for the current call 235. The forecasting module 246 applies the context data 305 for the current call 235 as inputs to the model 245_1. As a result of these inputs, the model 245_1 generates a first output 310 that represents a forecast probability the callee will answer the current call 235 and second output 315 that represents a forecast amount of time to ring for the current call 235. In embodiments, the first output 310 is a number between 0 and 1 or a percent between 0% and 100%. In embodiments, the second output 315 is a numeric value of a time in seconds or a numeric value of a number of rings.

Figure 4:
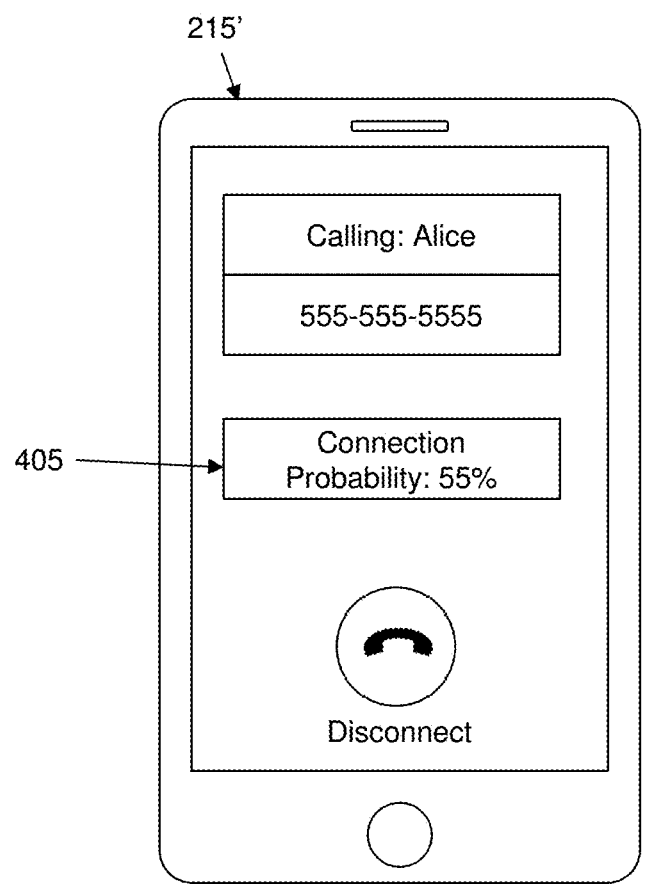
FIG. 4 shows an exemplary display at a caller device in accordance with aspects of the invention.

In embodiments, in response to determining the first output 310 for the current call 235, the call server 210 transmits data to the caller device 215' that causes the caller device 215' to display the determined probability that the callee will answer the current call 235. For example, as illustrated in FIG. 4, the instructions from the call server 210 cause the caller device 215' to display the probability 405 that the callee will answer the current call 235. In embodiments, the probability 405 that is displayed at the caller device 215' is the same value as the first output 310. In this manner, the caller is provided with information that is useful in deciding whether the callee is apt to answer the current call.

In embodiments, in response to determining the second output 315 for the current call 235, the call server 210 transmits instructions to the callee device 220 to adjust a number of rings for the current call 235 (e.g., change the number of rings from a pre-defined number of rings), wherein the amount of adjustment is based on the second output 315. For example, the user device may be set to a default value of 4 rings for incoming calls before going to voicemail. However, in this example, the second output 315 of the model predicts that the callee should be provided with an amount of time equal to 7 rings when answering the current call 235. This second output 315 may be influenced, for example, based on context data of previous calls (e.g., calls 212a-n) indicating that the current call is important to the callee (e.g., a probability of the callee answering exceeds a predefined high threshold), and also on the determined current callee activity and/or current callee location being such that it is expected that more than the normal amount of rings is needed for the callee to have time to answer the current call 235 (e.g., the callee is in a business meeting and extra time would be helpful to exit the meeting before answering). For example, as shown in FIG. 5, the instructions from the call server 210 cause the callee device 220 to adjust the number of rings by +3 (e.g., add three rings to the default number of rings) as indicated at reference number 505.

Figure 5:
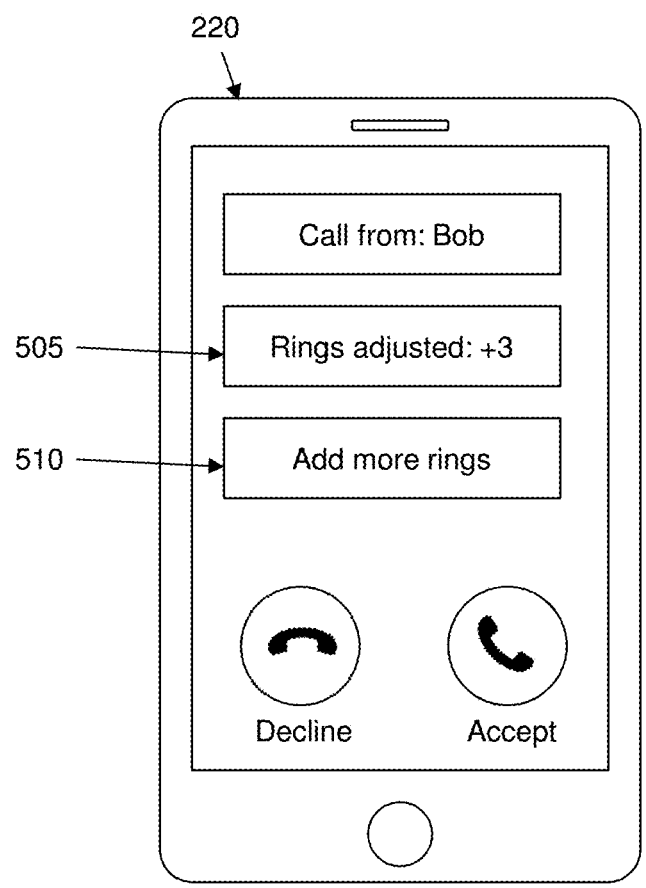
FIG. 5 shows an exemplary display at a callee device in accordance with aspects of the invention.

In embodiments, as depicted in FIG. 5, the callee device 220 may display a user input field 510 that the callee may utilize to add more rings to the determined number of rings for the current call 235. Continuing the example from above, if the callee wishes to answer the current call 235 but needs more time to exit the business meeting, then the callee may finger tap the "add more rings" button 510, in which case the callee device 220 will ring a predetermined additional number of times (e.g., in addition to the default number and any adjustment, e.g., as indicated at 505) before disconnecting or going to voicemail. In embodiments, when the callee provides input to request additional rings, the analysis and logging module 242 logs the context data for the current call (including the increased number of rings reflected in the Time to connection data field), and the modeling module 244 updates the model 245_1 using the new corpus of data (e.g., the previous corpus of call context data plus the context data for the current call). In this manner, the amount of time it takes a callee to answer the current call 235, as well as the other context data associated with the current call 235, is used as additional data to refine the model 245_1 for this callee.

The example described with respect to FIG. 5 illustrates a situation in which the second output 315 of the model results in adding rings to the default number of rings at the callee device 220 (e.g., an adjustment of +3). However, the adjustment can also be a negative number, an adjustment of zero, or straight to voicemail. The model may output a negative adjustment, for example, when the current call is determined to be relatively less important to the callee (e.g., a probability of the callee answering is less than a first predefined low threshold) and also when the callee is determined to be busy (e.g., when any one or more of the current callee location, current callee activity, and current callee emotional state are similar to the callee location, callee activity, and callee emotional state of previous calls when the callee did not answer the previous call). The model may generate an output that corresponds to a straight to voicemail instruction, for example, when the current call is determined to be unimportant to the callee (e.g., a probability of the callee answering is less than a second predefined low threshold that is lower than the first predefined low threshold) and also when the callee is determined to be busy (e.g., when any one or more of the current callee location, current callee activity, and current callee emotional state are similar to the callee location, callee activity, and callee emotional state of previous calls when the callee did not answer the previous call). This is merely an example, and the output of the model will be based on the context data of the previous calls 212*a-n* for this particular callee.

Figure 6:
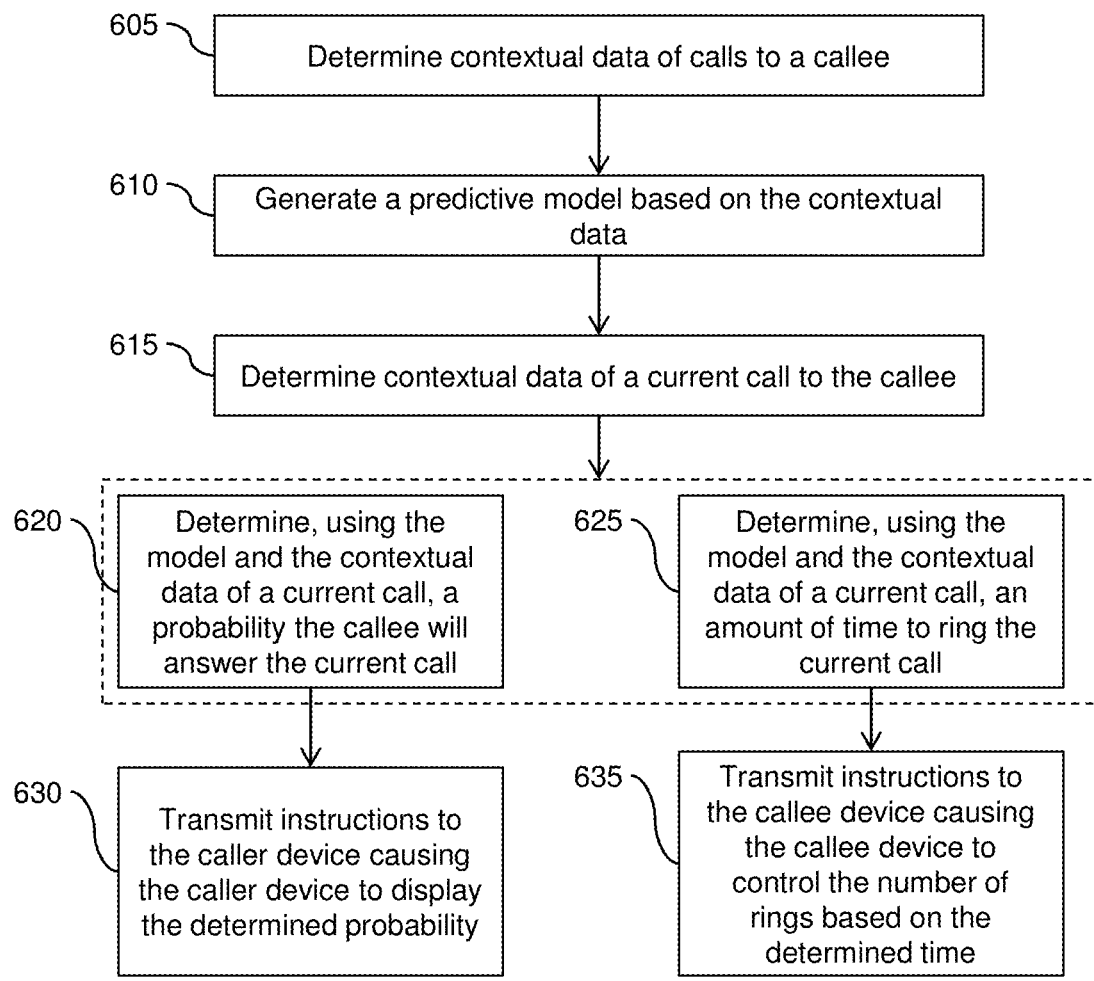
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 2 and are described with reference to elements depicted in FIG. 2.

At step 605, the system determines contextual data of calls to a callee. In embodiments, and as described with respect to FIG. 2, the analysis and logging module 242 determines and stores contextual data for incoming calls 212*a-n* received by the callee device 220. In embodiments, the contextual data includes at least one of: time to connection; connection status; caller ID; date and time; callee location; receiving device; callee activity; and callee emotional state.

At step 610, the system generates a predictive model based on the contextual data from step 605. In embodiments, and as described with respect to FIG. 2, the modeling module 244 derives the model for this callee based on analyzing the contextual data of calls 212*a-n*. In embodiments, the model is a logistic regression model derived using logistic regression analysis of the contextual data of calls 212*a-n*. In embodiments, the modeling module 244 derives a respective unique model for each different callee.

At step 615, the system determines contextual data of a current call to the callee. In embodiments, and as described with respect to FIG. 2, the analysis and logging module 242 determines contextual data for a current call 235 from a caller device 215' to the callee device 220.

At step 620, the system determines, using the model (from step 610) and the contextual data of the current call (from step 615), a probability the callee will answer the current call. In embodiments, and as described with respect to FIG. 2, the forecasting module 246 applies the contextual data of the current call as inputs to the model, and in response the model outputs a probability the callee will answer the current call.

At step 625, the system determines, using the model (from step 610) and the contextual data of the current call (from step 615), an amount of time to ring the current call. In embodiments, and as described with respect to FIG. 2, the forecasting module 246 applies the contextual data of the current call as inputs to the model, and in response the model outputs an amount of time that the current call should be allowed to ring at the callee device 220 before going to voicemail.

In an embodiment, steps 620 and 625 are performed simultaneously, e.g., as indicated by the dashed box around both steps in FIG. 6. In this embodiment, the model generates the two outputs simultaneously. In another embodiment, steps 620 and 625 are performed separately.

At step 630, the system transmits instructions to the caller device causing the caller device to display the determined probability from step 620. In embodiments, and as described with respect to FIG. 2, the call server 210 transmits instructions to the caller device 215' to display the determined probability that the callee will answer the current call. In embodiments, and as described with respect to FIG. 4, the caller device 215' displays the determined probability in a user interface.

At step 635, the system transmits instructions to the callee device causing the callee device to control the number of rings based on the determined time from step 625. In embodiments, and as described with respect to FIG. 2, the call server 210 transmits instructions to the callee device 220 to cause the callee device 220 to ring for one of: the standard duration (e.g., the predefined number of rings), a longer duration (e.g., a number of rings more than the predefined number of rings), a shorter duration (e.g., a number of rings less than the predefined number of rings), direct to voicemail (e.g., zero rings). In embodiments, the adjustment to the predefined number of rings at step 635 is based on the determined time from step 625.

As described herein, aspects of the invention may be used to provide a method for deriving a probability of connection of a phone call, the method comprising: identifying a call being placed; determining the caller and the recipient of the call; identifying past history of the recipients answering habits based on the caller, time of day, emotional state, current activities, etc.; calculating a likelihood of answering the call by the recipient based on the past history for the current call and similar call; and presenting the caller with the calculated likely of the recipient answering the call. In embodiments, the method further comprises determining how long to allow the call to ring based on the current status of the recipient and the likelihood of answering the call.

It should be understood that, to the extent implementations of the invention collect, store, or employ personal information provided by, or obtained from, individuals (for example, contextual call data determined by the call server 210), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computer device, contextual data of plural calls to a callee;
   generating, by the computer device, a predictive model based on the contextual data of the plural calls;
   determining, by the computer device, contextual data of a current call to the callee;
   determining, by the computer device and based on the model and the contextual data of the current call, a probability that the callee will answer the current call;
   determining, by the computer device and based on the model and the contextual data of the current call, an amount of time to ring for the current call;
   instructing, by the computer device, a caller device to display the determined probability; and
   instructing, by the computer device, a callee device to control an amount of rings for the current call based on the determined amount of time to ring.

2. The method of claim 1, wherein the contextual data of the plural calls and the contextual data of the current call each comprises: time to connection; connection status; caller ID; date and time; callee location; receiving device; callee activity; and callee emotional state.

3. The method of claim 1, wherein the contextual data of the plural calls and the contextual data of the current call each comprises at least one selected from the group consisting of: time to connection; connection status; caller ID; date and time; callee location; receiving device; callee activity; and callee emotional state.

4. The method of claim 1, wherein the contextual data of the plural calls and the contextual data of the current call each comprises caller ID data that represents a numerical measure of closeness of a relationship between a caller and the callee.

5. The method of claim 4, further comprising determining the caller ID data based on analyzing at least one from the group consisting of: number of past calls between the caller and the callee; surnames of the caller and the callee; closeness of geographic locations of the caller and the callee; and social media information that defines one or more relationships between the caller and the callee.

6. The method of claim 1, wherein the contextual data of the plural calls and the contextual data of the current call each comprises callee activity data that represents a determined activity the callee is engaged in at a time of the respective call.

7. The method of claim 6, further comprising determining the callee activity data based on analyzing at least one from the group consisting of: data from one or more electronic calendars of the callee; and data from one or more biometric devices of the callee.

8. The method of claim 1, wherein the contextual data of the plural calls and the contextual data of the current call each comprises callee emotional state data that represents a determined emotional state of the callee at a time of the respective call.

9. The method of claim 8, further comprising determining the callee emotional state data based on analyzing at least one from the group consisting of: data from one or more recent communications of the callee; and recent biometric data of the callee.

10. The method of claim 1, wherein the controlling the amount of rings for the current call comprises one of:
    causing the callee device to ring for longer than a predefined duration based on the determined amount of time to ring;
    causing the callee device to ring for shorter than a predefined duration based on the determined amount of time to ring;

causing the callee device to ring for a predefined duration based on the determined amount of time to ring; and causing the callee device to go straight to voicemail based on the determined amount of time to ring.

11. The method of claim 1, further comprising instructing the callee device to display a user option to add more rings for the current call.

12. A computer program product, the computer program product comprising a computer readable storage medium having program instructions embodied therewith, the program instructions executable by a computer device to cause the computer device to:

determine contextual data of plural calls to a callee;

generate a predictive model based on the contextual data of the plural calls;

determine contextual data of a current call to the callee;

determine, based on the model and the contextual data of the current call, a probability that the callee will answer the current call; and instruct a caller device to display the determined probability.

13. The computer program product of claim 12, wherein the contextual data of the plural calls and the contextual data of the current call each comprises: time to connection; connection status; caller ID; date and time; callee location; receiving device; callee activity; and callee emotional state.

14. The computer program product of claim 12, wherein the contextual data of the plural calls and the contextual data of the current call each comprises at least one selected from the group consisting of: time to connection; connection status; caller ID; date and time; callee location; receiving device; callee activity; and callee emotional state.

15. A system comprising:

a processor, a computer readable memory, and a computer readable storage medium;

program instructions to determine contextual data of plural calls to a callee;

program instructions to generate a predictive model based on the contextual data of the plural calls;

program instructions to determine contextual data of a current call to the callee;

program instructions to determine, based on the model and the contextual data of the current call, an amount of time to ring for the current call;

program instructions to instruct a callee device to control an amount of rings for the current call based on the determined amount of time to ring, wherein the program instructions are stored on the computer readable storage medium for execution by the processor via the computer readable memory.

16. The system of claim 15, wherein the contextual data of the plural calls and the contextual data of the current call each comprises: time to connection; connection status; caller ID; date and time; callee location; receiving device; callee activity; and callee emotional state.

17. The system of claim 15, wherein the contextual data of the plural calls and the contextual data of the current call each comprises at least one selected from the group consisting of: time to connection; connection status; caller ID; date and time; callee location; receiving device; callee activity; and callee emotional state.

18. The system of claim 15, wherein the controlling the amount of rings for the current call comprises one of:

causing the callee device to ring for longer than a predefined duration based on the determined amount of time to ring;

causing the callee device to ring for shorter than a predefined duration based on the determined amount of time to ring;

causing the callee device to ring for a predefined duration based on the determined amount of time to ring; and causing the callee device to go straight to voicemail based on the determined amount of time to ring.

19. The system of claim 15, further comprising program instructions to instruct the callee device to display a user option to add more rings for the current call.

20. The system of claim 15, wherein the predictive model is a logistic regression model that is generated using logistic regression analysis of the contextual data of the plural calls.

* * * * *